No. 645,370. Patented Mar. 13, 1900.
A. W. McCURDY.
REGISTERING MECHANISM FOR CAMERAS.
(Application filed Apr. 25, 1899.)
(No Model.) 2 Sheets—Sheet 1.
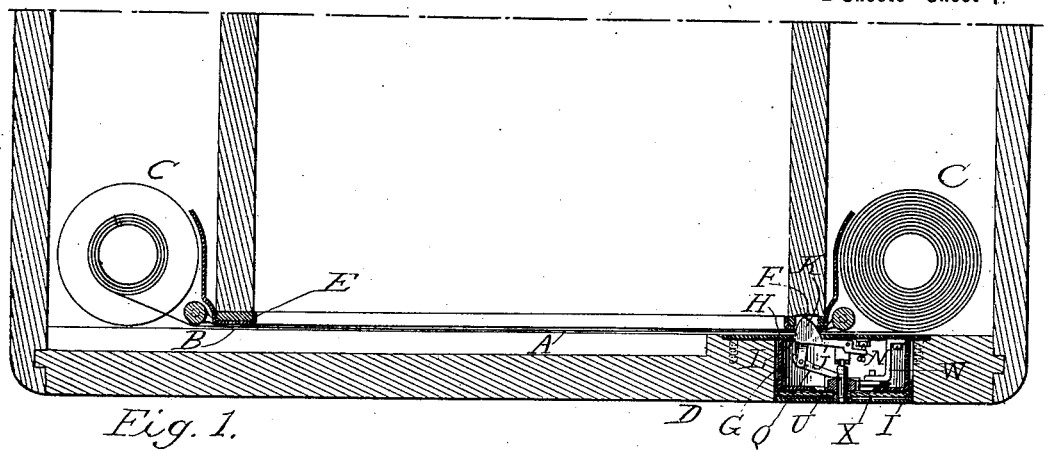
Fig. 1.
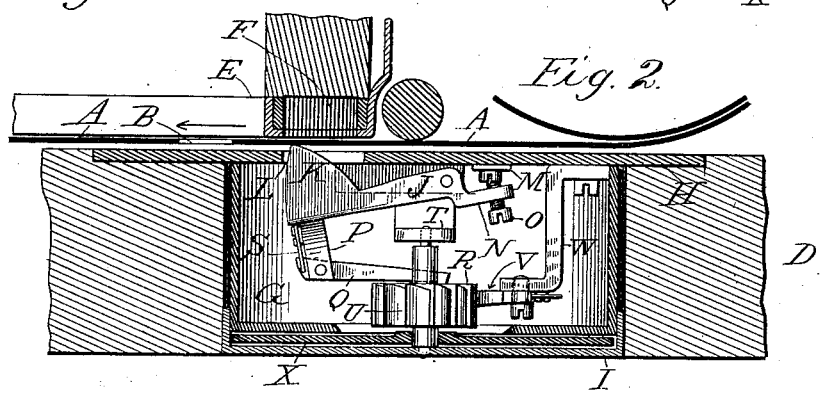
Fig. 2.
Fig. 3
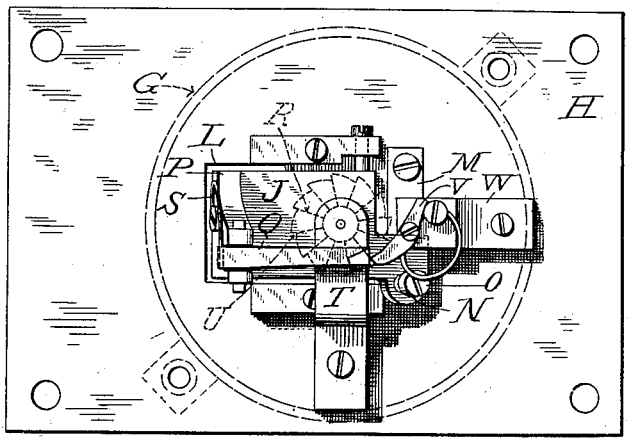
Witnesses
C. C. Bindure
J. B. Malnati
Inventor:
Arthur W. McCurdy,
by Dodge and Sons,
Attorneys No. 645,370. Patented Mar. 13, 1900.
A. W. McCURDY.
REGISTERING MECHANISM FOR CAMERAS.
(Application filed Apr. 25, 1899.)
(No Model.) 2 Sheets—Sheet 2.

Witnesses
Inventor:
Arthur W. McCurdy,
by Dodge and Sons,
Attorneys

THE NORRIS PETERS CO., PHOTO-LITHO., WASHINGTON, D. C.

UNITED STATES PATENT OFFICE.

ARTHUR W. McCURDY, OF WASHINGTON, DISTRICT OF COLUMBIA.

REGISTERING MECHANISM FOR CAMERAS.

SPECIFICATION forming part of Letters Patent No. 645,370, dated March 13, 1900.

Application filed April 25, 1899. Serial No. 714,403. (No model.)

*To all whom it may concern:*

Be it known that I, ARTHUR W. MCCURDY, a subject of the Queen of Great Britain and Ireland, residing at Washington, District of Columbia, have invented certain new and useful Improvements in Registering Mechanism for Cameras, of which the following is a specification.

My present invention pertains to photographic cameras, and has to deal more particularly with the registering mechanism for indicating or denoting the position of the film as it is moved along in the camera to bring the different plates or surfaces to be exposed into position.

The invention is illustrated in the accompanying drawings, wherein—

Figure 4:
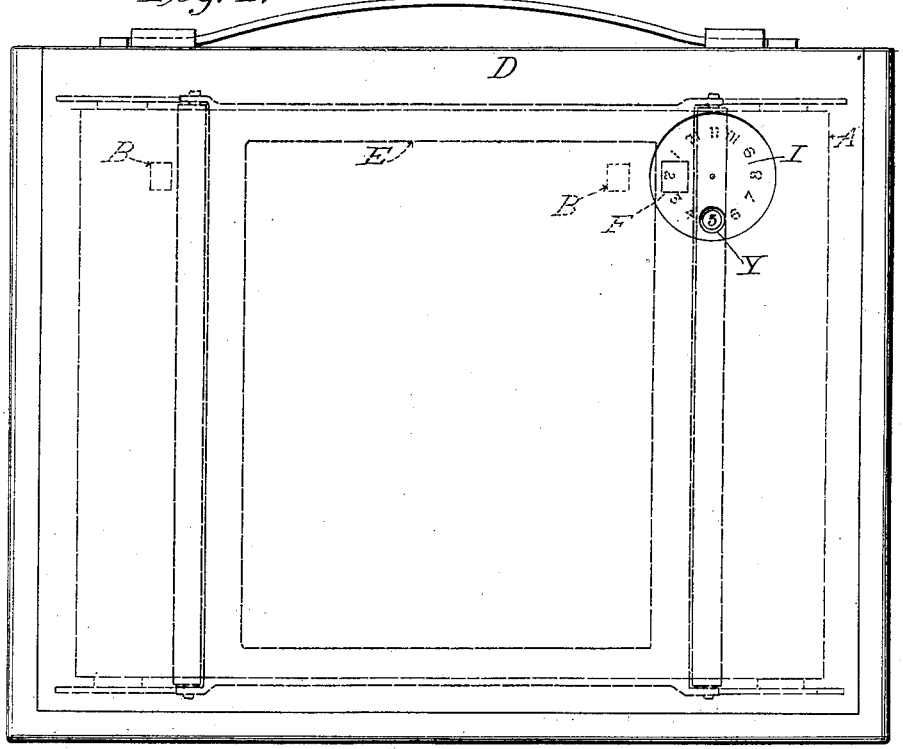
Figure 5:
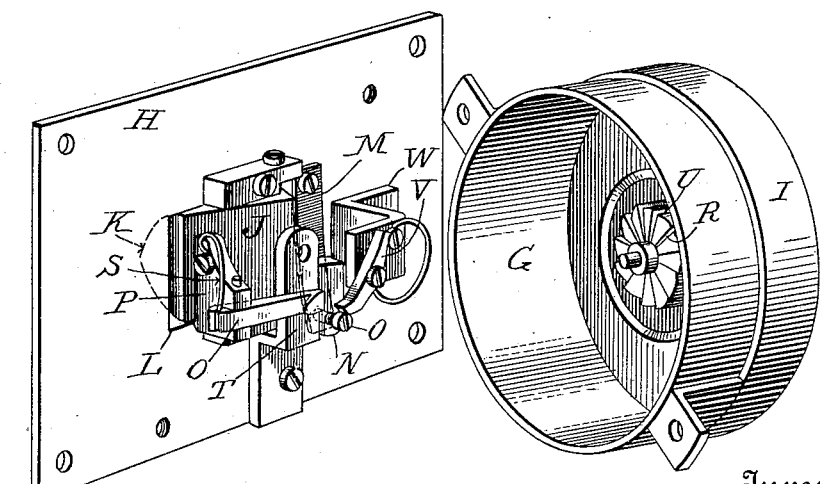

Figure 1 is a horizontal sectional view of so much of a camera as is necessary to the proper illustration of the invention; Fig. 2, a similar view on an enlarged scale; Fig. 3, a front elevation of the registering mechanism, the cap or cover being removed and the ratchet-wheel being shown in dotted lines; Fig. 4, an elevation of the rear face of the camera; and Fig. 5, a perspective view of the registering mechanism, some of the parts being shown detached.

The object of my invention is to provide a simple and efficient registering device for indicating the position of the film within the camera, so that as each and every exposure or plate upon the film is brought to its proper position the fact will be visually indicated.

In using the registering device about to be described I employ or make use of a continuous film A, provided with a series of openings or perforations B adjacent to one edge thereof, as indicated in Figs. 1 and 2 and in dotted lines in Fig. 4. Said film, as is usual, passes from one spool to another within the camera about suitable rolls C C, adjacent to the back D.

In the form of camera shown in the drawings and which of course must be taken simply as an illustrative type a frame E is employed, said frame occupying a position at the end of the exposure-chamber, intermediate the rolls C C, and serving to define the part of the film being exposed. The back D is provided with an opening in line with the openings or perforations in the film, and within said opening or recess is seated and secured the registering mechanism. Frame E at a point opposite the registering mechanism is cut out, forming a pocket or recess F, Figs. 1 and 2, into which the nose of the registering mechanism enters when it passes through one of the perforations in the film. Said frame E forms, in effect, what may be termed a "film-support"—that is, it serves to support and prevent the film from being torn at that point where the actuating-lever hereinafter referred to is located and acts.

The registering mechanism in the form indicated is inclosed within a shell or casing G and a plate H, the plate being secured to the inner face of the back of the camera and the shell or casing with its outer cap or cover I being of such height as to come flush with the outer surface of the back.

Pivotally mounted upon the plate H is a lever J, having at its outer end a nose K, which is in line with an opening L, formed in said plate H. A spring M is secured to the plate H in rear of the pivotal point of lever J and passes beneath a rearwardly-extending arm N, carried by or formed on said lever. A screw O is mounted in arm N and bears upon the face of the spring M, the spring serving to throw the forward end of the lever down toward plate H and project the nose K beyond the face of the plate through the opening L.

Pivotally mounted in a projection P, extending up from the outer end of lever J, is a pawl Q, its free hooked end extending beneath a ratchet-wheel and engaging with one series of ratchet-teeth R, formed on the end thereof. A spring S serves to hold the pawl in engagement with the teeth. The ratchet-wheel is provided with suitable spindles at each end, one of which is mounted in an arm T, secured to the plate H, while the other is journaled in the outer cap I. Said ratchet-wheel is provided with a second set of teeth U around its periphery, and a spring-actuated dog or detent V, mounted upon a suitable arm or support W, engages said teeth U and prevents the ratchet from being rotated backward. The outer end of the ratchet-wheel shaft has secured to it an indicator plate or dial X, provided with a series of numbers or notations, usually "1" to "12," inclusive, said plate lying between the upper end of the shell or casing G and the cap I. Cap I is provided with an opening Y, through which the notations or numbers may be seen, one at a time, as they are brought to view.

The perforations in the film are of course so spaced as to mark off each exposure or plate on the film, and, in the form of camera illustrated in the drawings, come opposite the upright members of the frame E when the film is in position for an exposure.

The operation of the mechanism is as follows: The user of the camera first places the spool with the film rolled thereon in position, as is usual, and unwinds the paper therefrom and passes it over to the opposite spool, when of course the camera is ready for action. It is my intention to use a film without the usual backing of paper and to simply attach a strip of paper to each end of the film, though it is manifest that the ordinary film and backing-sheet may be used, the film and paper both being perforated. The operator after threading the paper, as above, winds one spool about until the indicator shows the figure "1," or the first notation employed. This will occur when the first exposure-surface on the film is in place and the first perforation comes beneath nose K and over recess F. Previous to this time nose K has been bearing or riding first on the black paper which is wound around the spool and then on the unsensitized face of the film; but as soon as the perforation comes beneath the nose it will pass therethrough, spring M serving to actuate it no matter what be the position of the camera. In passing through the opening or perforation in the film pawl Q will be carried or swung forward and as its hooked end is in engagement with one of the teeth R it will rotate the ratchet-wheel and the index-plate X one step, bringing the first numeral beneath the exposure-opening Y. The parts are then in the position shown in Fig. 1. After the exposure has been made the operator winds the film forward in the direction indicated by the arrow in Fig. 2 or in the direction of the length of the lever J, and as this is done the opening in the film passes out of line with nose K, thereby raising the nose and lever up into the position indicated in said Fig. 2. Inasmuch as the face of the nose is inclined or beveled, it rides easily out of the opening, it being found from actual use that there is no difficulty whatsoever experienced from the film tearing or splitting. It will be noted that the film has only to lift the lever against the action of spring M and cause the pawl Q to pass back the space of one tooth on the ratchet-wheel. The spring S, which holds the pawl Q against the teeth, is very light, and, as will be noted upon reference to Fig. 5, the hooked end or head of the pawl is beveled or rounded, so as to pass freely and with but little friction beneath the tooth during the backward movement of said pawl. Of course as pawl Q is being moved back by the upward movement of lever J dog or detent V holds the ratchet against any backward movement, preventing the notation just brought to view from being changed. When the film has traveled far enough to entirely remove the exposed portion thereof from the exposure-chamber, another hole or perforation in the film will be over the recess F, and immediately lever J will again be moved and its nose K passed through the opening, thereby causing the ratchet-wheel and dial to rotate one step and bring the next notation to view. These steps will be carried on until the film is used.

It will be noted that nose K bears on the celluloid or unsensitized face of the film, so that in no manner can the sensitized face of the film be injured thereby. It will also be seen that the location of the registering device in the back of the camera is the same as the usual inspection-opening, wherein the number on the black paper is brought to view, so that these cameras may be readily supplied with the device herein described.

With cameras of a different type from that shown in the drawings the indicating mechanism will of course be differently located, the arrangement being such that the film will be brought to the proper place and the fact denoted by the indicator.

It will be observed that the actuation of the indicator takes place when the lever or its nose moves into one of the openings in the film and that there is no movement of the lever by and with the film to cause the actuation of the indicator. In other words, it is the direct movement by a spring of the lever across the path of travel of the film or through one of the openings therein which directly and positively actuates the indicator, and in this particular my invention is to be distinguished from those constructions wherein the lever or actuating device is first brought into engagement or connection with the film and is then moved by and with the film to cause the actuation of the indicator.

Having thus described my invention, what I claim is—

1. In a camera or roll-holder, the combination of a suitable indicating device; a lever for actuating the same; and a spring for moving said lever across the path of travel of the film and by said movement causing a positive actuation of the indicator, substantially as described.

2. In a camera or roll-holder, the combination of a suitable indicating device; a lever for actuating the same, said lever having a movement out into the path of travel of a film; and means for yieldingly holding said lever in contact with the film, and causing it to pass through openings in the film and by said movement to actuate the indicator, substantially as described.

3. In a camera or roll-holder, the combination of a film-support; an indicating device; a lever for actuating said indicating device; and means for moving said lever toward said film-support, across the path of travel of the film and by said movement actuating the indicator.

4. In a camera or roll-holder, the combination of a suitable indicating device; and means adapted to actuate the same extending out into the path of travel of a film, said means being so arranged and adapted that it will normally rest on one surface of the film and hold the indicating mechanism out of action, but will move and actuate the same when released by the film, substantially as described.

5. In a camera or roll-holder, the combination of a film-support; and a registering device projecting toward said support, across the path of travel of a film, said device being adapted to be moved back from said support by a perforated film, substantially as described.

6. In a camera or roll-holder, the combination of a film-support; an indicating device; a lever for actuating said indicating device, movable toward and from said support, across the path of travel of the film; a spring for throwing said lever toward the film-support and thereby actuating the indicator; and means substantially such as described for holding the indicator against backward rotation.

7. In a camera or roll-holder, the combination of a film-support; an indicating device; a lever for actuating the same, said lever being movable toward and from said support, across the path of travel of the film; a spring for throwing said lever toward the support and thereby actuating the indicator; and a dog or detent for holding the indicating device in opposition to the backward movement of the lever.

8. In a camera or roll-holder, the combination of a film-support; an indicating device; a lever, said lever being provided with a nose K at its outer end; a spring for actuating said lever and throwing its nose across the path of travel of the film; a pawl carried by said lever for actuating the indicating device as the nose of said lever is thrown across the path of travel of the film; and a dog or detent for holding the indicating device in opposition to the rearward movement of the pawl.

9. In a camera or roll-holder, the combination of a film-support; a lever provided with a nose K; a spring for throwing said lever in one direction and projecting its nose across the path of travel of a film; a ratchet-wheel; an indicating-plate connected to said ratchet-wheel; a pawl Q connected to the lever and adapted to move the ratchet-wheel in one direction as the nose of the lever is projected across the path of travel of the film; and a dog or detent serving to hold the ratchet in its adjusted position.

10. In a camera or roll-holder, the combination of a suitable film-support; a lever provided with a nose K adapted to pass across the path of travel of a film and toward said film-support; a spring M for actuating said lever; a ratchet-wheel; an indicating-plate carried by said wheel; a spring-actuated pawl Q carried by said lever for actuating the ratchet-wheel as the nose of the lever is thrown across the path of travel of the film; and a locking dog or detent V for holding the ratchet-wheel against rearward movement.

11. In combination with an indicating device; a setting-lever, and a spring for actuating the same; and a film movable relatively to the lever and adapted to come into direct operative relation therewith, said film being provided with openings, whereby the lever is thrown back by the film and is permitted to move forward under the force of the spring and thereby to actuate the indicating device when an opening of the film comes opposite the lever.

12. In combination with an indicator; a spring-actuated pawl for moving the same; and a traveling perforated film adapted to throw the pawl back to its engaging position and to permit its forward or actuating movement when an opening of the film comes to a predetermined position.

13. In a camera or roll-holder, the combination with means for supporting and advancing a perforated film; of an indicator; an operating device therefor, said device being supported independently of the film supporting and advancing means; connections intermediate the operating device and the indicator; and means for normally pressing said device toward the film so that it will pass into the perforations therein as they come into registration therewith, and by said movement, into the perforations, to directly actuate the indicator, substantially as described.

14. In a camera or roll-holder, the combination with means for supporting and advancing a perforated film, of an indicating device; a lever; and means for normally pressing said lever toward the film and causing it to pass into the perforations therein, and by said movement to actuate the indicator, substantially as described.

15. In a camera or roll-holder, the combination with means for supporting and advancing a perforated film, of an indicating device; a lever supported independently of the film supporting and advancing means; and means for normally pressing said lever toward the film and causing it to pass into the perforations therein, and by said movement to actuate the indicating device, substantially as described.

In witness whereof I hereunto set my hand in the presence of two witnesses.

ARTHUR W. McCURDY.

Witnesses:
WILLIAM W. DODGE,
HORACE A. DODGE.